UNITED STATES PATENT OFFICE.

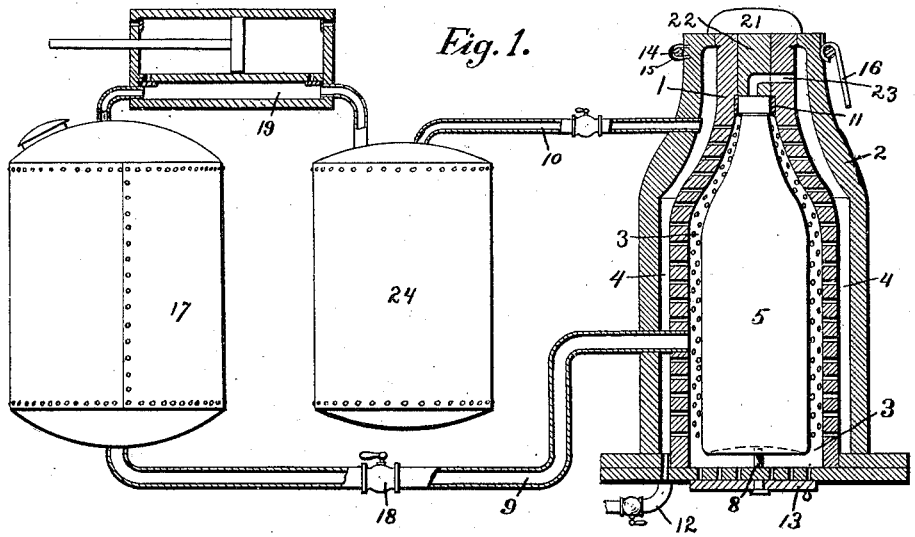
No. 644,905. Patented Mar. 6, 1900.
W. W. GARIS.
METHOD OF COATING FRAGILE VESSELS.
(Application filed Sept. 2, 1899.)
(No Model.)

WEBB W. GARIS, OF EAST STROUDSBURG, PENNSYLVANIA.

METHOD OF COATING FRAGILE VESSELS.

SPECIFICATION forming part of Letters Patent No. 644,905, dated March 6, 1900.

Application filed September 2, 1899. Serial No. 729,317. (No specimens.)

*To all whom it may concern:*

Be it known that I, WEBB W. GARIS, a citizen of the United States, residing at East Stroudsburg, in the county of Monroe and State of Pennsylvania, have invented certain new and useful Improvements in Methods of Coating Fragile Vessels, of which the following is a specification.

For externally protecting vessels of glass or earthenware I have invented a new method and device for coating such vessels with paper-pulp in semifluid form; and my invention resides in producing such coating upon the walls of the vessel by injecting fluid pulp within a space formed by a sealed metal flask and the vessel to be coated contained therein, whereby the pulp is caused to stick and firmly adhere to the walls of the vessel within a space which determines the thickness and form of such coating. Within this sealed metal flask the vessel to be coated is centrally supported, so that its side walls and bottom will be surrounded by a space having the exact shape of the inner walls of the flask and the correspondingly-shaped walls to be coated, so that the vessel itself and the flask form the molding-space within which the protecting-coating is forced.

The following description, read in connection with the accompanying drawings, will enable any person skilled in the art to which my invention relates to understand its nature and to practice it in the form which I prefer to employ it; but it will be understood that my invention is not limited to the precise form and construction herein illustrated and described, as various modifications and changes may be made without exceeding the scope of the claims in which my invention is set out.

Referring to the drawings, Figure 1 illustrates the method of coating a vessel with paper-pulp and the device employed for carrying out such method, wherein a vessel centered within a metal flask forms one of the walls of a coating-space. Fig. 2 is a vertical section of the flask device, showing the vessel therein coated. Fig. 3 is a horizontal section of the same, and Fig. 4 shows in detail the wire-cloth lining for the inner flask.

As illustrated, the coating device is constructed of a double flask, an inner perforated one, 1, forming the coating-space 3, and an outer one, 2, forming an air-space 4, both flasks having the same shape and the shape of the article to be coated. With this device pulp is forced within the inner space 3 around the vessel 5 to be covered. The inner walls and bottom of the inner flask are full of perforations, and may be made of steel or iron, the inner surface of which may be polished. The perforations can be quite large and the inner walls may be lined with fine wire-cloth 6. (Seen in Fig. 4.)

Preferably the flasks are made of two equal parts, the split being vertical and the outer parts hinged, so as to be opened and closed for the placing and removal of the vessel, and when closed they are fastened together by a suitable catch at or about midway from the bottom.

The vessel 5 to be coated is centrally supported within the inner flask by a bottom pin 8, which engages the hollow or center of the bottom concavity of the vessel, while the neck of the latter forms a close joint with the shouldered neck-walls of the flask, and the coating-space 3 is thereby formed between the bottom and side walls of the vessel and flask, into which the pulp is forced to coat the vessel to the shoulder formed exteriorly of its mouth. The space 3 may be formed to produce a thicker coating at the bottom and a thinner coating around the neck, and the pulp may be of wood, straw, or other suitable material. A valved pipe 9 for introducing the pulp passes through the double walls into the coating-space 3, either at a point near the shoulder of the body of the vessel or at any other point, while a pipe 10 for introducing air enters the space formed between the two flasks, preferably at or near the top of the flask. A ring or band packing 11 of two parts is seated in a groove in the inner flask at the shouldered mouth of the vessel and seals the coating-space when the flask is closed. A cock 12 enters the bottom of the air-space 4, whereby the water pressed from the pulp outward through the perforations of the inner flask into said space 4 is drawn off. The bottom of the coating-flask is also perforated for draining off the water forced down beneath the vessel, and to close these bottom perforations a register-valve 13 may be provided below the bed-plate of the device. The draw-off cock 12 and the bottom perforations are closed when the air is introduced under pressure into the space formed between the two flasks for the purpose of forcing out by pressure through the perforations any water that may still remain in the coating and for drying the same. For this purpose the air may be hot, and what water may gather at the perforated bottom under such air-pressure can be drained off by opening the register-valve.

When the flask is closed, its neck part is firmly sealed by a metal ring 14, secured to the flask by an eye 15, so that the ring can be put over the neck of the flask and drawn tight by a swing-arm 16, binding against the wall of the flask like an eccentric.

For supplying the pulp a tank 17 is provided and connected to valved pipe 9 and the bottom of the tank, which has a suitable removable top, lid, or cover for filling the pulp in a proper degree of fluidity. The cover is suitably fastened to resist the pressure in the tank, while a cock 18 controls the communication between the tank and the coating-space of the flask. For forcing the pulp from the tank into the space around and upon the walls of the vessel a pump 19 is provided and connects the top of the tank and maintains therein a high pressure, so that when the tank is in direct communication with the coating-space the pulp will be forced all around the walls of the vessel and caused to stick and firmly adhere thereto; but the pulp will not stick to the polished walls of the flask or to the wire-gauze which may be used as a lining to the flask. The air-pressure must be sufficient to give the proper compactness to the coating as the pulp is forced into the space. The adhesion of the coating to the vessel allows the flask to be opened without any pulling action upon the coating.

As the pulp will be sufficiently fluid to flow freely by force, I provide the pump with one or more pipes 10 for forcing air into the outer space, from which it presses inward through the perforated inner flask upon the pulp to give it the proper compression and to expel any water that may remain through the perforations. While I propose air-pressure within the outer space, yet such pressure may not be found necessary. When the pulp is forced into the coating-space, the water will be forced out of said space through the perforations into the outer space and can be drawn off at intervals or continuously. When this is done, the cock is closed, and air, hot or cold, may be forced into the outer space and through the perforations to finish the drainage and to dry the coating. For this independent air-supply I provide a tank 24 for supplying hot air and heat it in any suitable way, and this tank has a valved connection with the air-pipe 10 and may be supplied from the same pump which supplies compressed air to the pulp-tank by which the pulp is forced therefrom. Any suitable pulp and air forcing means may be used.

It is important to note that my improvement gives the advantage of coating any form and size of vessel, and particularly demijohns and carboys, and, so far as I know and can find, the vessel itself has never been used as an element contained with a closure to form one of the walls of a space within which paper-pulp has been forced upon and around such vessel to coat it with a protecting-cover and in which the thickness of the cover is determined by the space formed by the closure-walls and the walls of the coated vessel. Such a protected vessel, by its hard and smooth molded walls, is readily distinguished from a vessel in which a paper covering is applied by shrinking upon the vessel a wet tube of fibrous paper, the open ends of which are closed over the neck and bottom portions of the vessel by handwork.

The chamber of the inner flask may be closed at its upper end; but I prefer to make it open-necked like a bottle and to close the opening by a stopper or cap 21, having a suitable cork 22 extending down on the top of the mouth of the vessel with sufficient pressure to hold it upon its central bearing, and thereby prevent its displacement by the pressure of the inflowing pulp. The bottom centering device, however, may be such as to afford a lateral support at the sides of the seated vessel.

The pulp may be forced by a pump or by steam or other power into the mold. The use of hot air for drying the coating will act to prevent the cracking of the coating, and to provide against breaking of the vessel by pressure while being coated I make provision, preferably by an air-duct 23 in the neck of the inner flask, so that the air entering the outer space will be forced into the mouth of the vessel, and thereby equalize the pressure on its inner and outer sides. Water may be used in the vessel or any other means that will give an interior supporting-pressure against the external coating-pressure.

I do not claim herein the described and illustrated invention in apparatus either in its construction or in its combinations, since the subject-matter of the claims thereof will be made by me the subject of a separate application for a patent.

I claim—

1. The process of coating fragile vessels which consists in forming the coating upon the walls of the vessel, by injecting pulp under pressure into a space bounded by the walls of the vessel and a closure and having the contour and thickness of the coating and expressing the water from the pulp through the walls of the closure.

2. The process of coating fragile vessels which consists in forming the coating upon the walls of the vessel, by injecting pulp under pressure into a space bounded by the walls of the vessel and a closure and having the contour and thickness of the coating, expressing the water from the pulp through the perforated walls of the closure and drying the coating by hot air injected through the closure-walls.

3. The method of coating fragile vessels which consists in impacting pulp under pressure in a molding-space one of the walls of which is the article being coated.

4. The process of coating fragile vessels which consists in supporting the vessel within a closure-formed space having the contour and thickness of the coating, injecting into such space pulp under pressure upon the walls of the vessel and expressing the water from the pulp through the closure-walls.

In testimony whereof I affix my signature in presence of two witnesses.

WEBB W. GARIS.

Witnesses:
STEWART S. SHAFER,
WM. HENRY HART.